United States Patent [19]

Williams et al.

[11] 4,038,810
[45] Aug. 2, 1977

[54] CROP HARVESTING MACHINE WITH IMPROVED PICKUP REEL ASSEMBLY

[75] Inventors: Millard M. Williams, Celina; John W. Arnold, Coldwater, both of Ohio

[73] Assignee: Avco Corporation, Coldwater, Ohio

[21] Appl. No.: 716,592

[22] Filed: Aug. 23, 1976

Related U.S. Application Data

[63] Continuation-in-part of Ser. No. 614,396, Sept. 18, 1975, abandoned.

[51] Int. Cl.² .................................................. A01D 57/02
[52] U.S. Cl. .................................................. 56/220
[58] Field of Search .................................. 56/220–227, 56/219, 328 R, 364

[56] References Cited

U.S. PATENT DOCUMENTS

| 2,652,678 | 9/1953 | Ramccher | 56/328 R |
| 3,561,198 | 2/1971 | Herbsthofer | 56/221 |

FOREIGN PATENT DOCUMENTS

| 627,546 | 9/1961 | Canada | 56/220 |

*Primary Examiner*—Jay N. Eskovitz
*Attorney, Agent, or Firm*—Charles M. Hogan; Robert J. McNair, Jr.

[57] ABSTRACT

Herein disclosed is a crop harvesting machine for collecting stalk crops having seed pods near ground level. The harvester includes a relatively large horizontally disposed reel structure. As the reel rotates, bat-assemblies thereon successively sweep downward into the crop and urge the stalks against a cutter bar. These assemblies feature a combination of flexible flaps and pickup reel tines which conserve and prevent loss of crops.

6 Claims, 14 Drawing Figures

CROP HARVESTING MACHINE WITH IMPROVED PICKUP REEL ASSEMBLY

BACKGROUND OF THE INVENTION

This application is a continuation-in-part of application Ser. No. 614,396, filed Sept. 18, 1975, now abandoned.

Our invention relates to improvements in crop harvesting machines which are capable of cutting stalk crops close to the ground. Basic working components of the harvester are the cutter bar, a pickup reel structure, a cutting platform to collect the severed plants, a cross auger assembly to centrally group the harvested plants, and an elevator assembly to deliver the plants to a thresher or processor.

Several different harvesters have been built for use in harvesting low growing crops such as lentils, soybeans and peas. U.S. Pat. No. 1,996,294 by Love and Hume describes a harvester having a cutter bar which provides a limited up and down movement with respect to the main frame. The U.S. Pat. No. to Hume (2,795,922) to Hume describes improvements over the earlier unit. U.S. Pat. No. 3,388,539 by Novak describes a floating cutter bar mount and sickle drive which can accommodate the irregular variations in ground contour. U.S. Pat. No. 3,597,907 by Neal describes a header elevational control system intended to keep the sickle bar close to the ground but not gouging therein. U.S. Pat. No. 2,209,997 by Nordhougen describes the addition of flexible strips to reel bats for sweeping grain from the guards across the deck of the harvester. None of the above has the features and advantages of our harvester.

SUMMARY OF THE INVENTION

The invention pertains to improvements in harvesters mounted transversely in front of a combine, mobile thresher or the like. Basic working components of the harvester include a main frame, a cutter bar mounted on the forward edge thereof, a rotating pickup reel assembly, a horizontally disposed platform to collect the severed plants, a cross auger assembly operating to centrally group the plants urged across the platform by the reel, and an elevator to deliver plants from the auger to an attached thresher. Various sprockets, pulleys, chains, belts and shafts operate the harvester using power from a take-off source located on the main frame of the thresher.

In accordance with the invention we provide a series of flexible flaps which slip over the reel tine ends and attach thereto by means of quick disconnect fasteners. The flaps, spanning only a few tines at a time, are placed at intervals along each reel bat. Circumferentially adjacent bats are located so as to have an offset, one bat to the next. In this way the flexible flaps sweep all areas of the horizontal platform at least once per each reel revolution. Thus, we achieve more positive control of short plants and shelled grain during harvesting, fewer cut plants and allow clamping of the flap section to the ends of the reel tines. An array of interval spaced flap sections of this type assures that the entire horizontal platform is swept clear of plants and shelled grain kernels at least once per each revolution of the reel assembly.

During the harvesting of down crops advantage is taken of the pickup action of the multiplicity of reel fingers present on a reel of the type described in U.S. Pat. Nos. 3,546,863 and 3,703,060. By placing flexible flaps on only a small fraction of the tines the pickup capability of the reel is retained, while at the same time providing a platform sweeping action at least once per each revolution of the reel assembly.

Our invention is of particular utility as incorporated in a machine of the type disclosed in the copending U.S. patent application Ser. No. 614,400 Millard M. Williams and Robert A. Stelzer, entitled "Crop Harvesting Machine with Flexible Cutter Bar", filed in the U.S. Patent and Trademark Office on Sept. 18, 1975 and assigned to the same assignee as the present application and invention, to wit: Avco Corporation.

BRIEF DESCRIPTION OF THE DRAWINGS

Having generally described the nature of the invention and the manner in which it functions, reference is made to the accompanying drawings, in which.

DESCRIPTION OF THE PREFERRED EMBODIMENT

Figure 1:
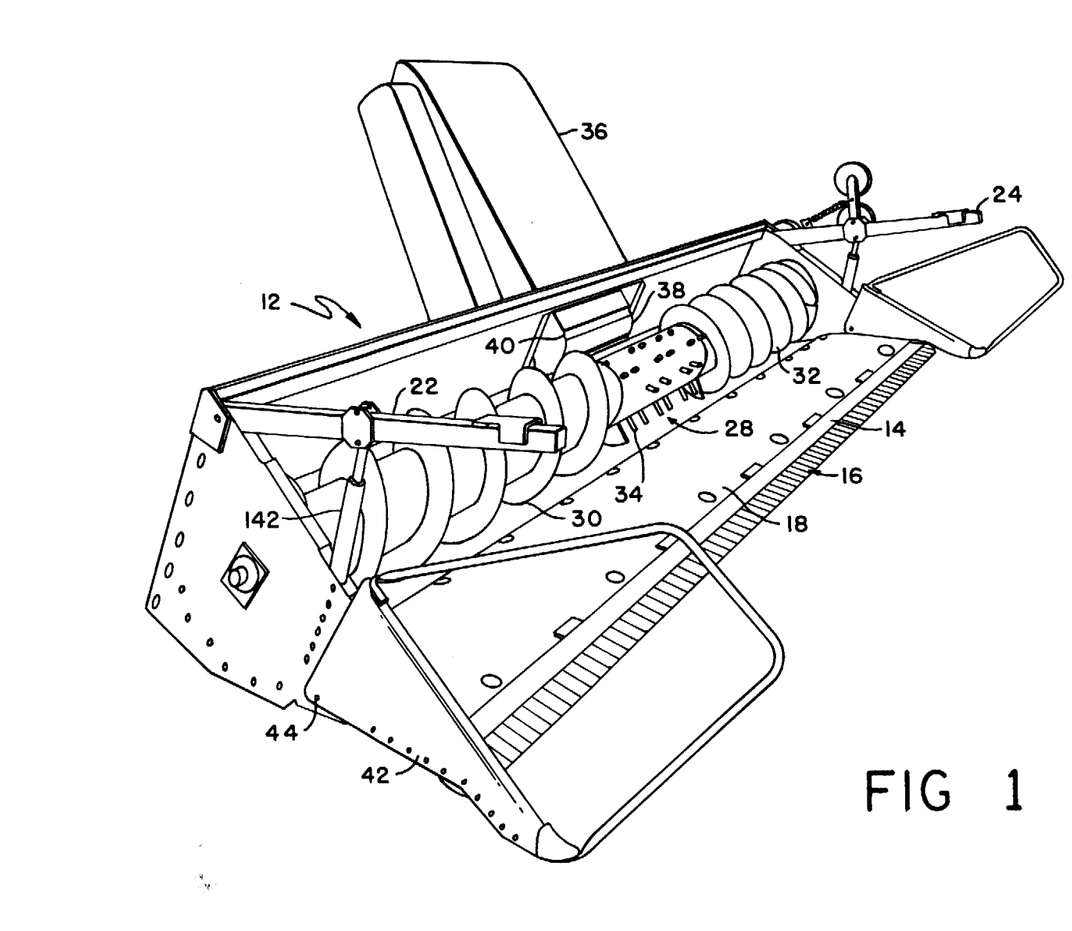
FIG. 1 shows an isometric view of the harvester construction of the aforesaid Williams-Stelzer application with which the invention is of particular utility.

In FIG. 1 there is shown an isometric view of a crop harvesting machine 12 which is arranged to be attached to and powered from a combine or other mobile thresher, not shown. The real assembly has been removed from the harvester so as to better expose the manner in which the various parts cooperate one with the next. A cutter bar 14 having oscillating sickle knives 16 is positioned along the front edge of the harvester. In operation harvesting machine 12 moves forward so that cutter bar 14 travels above or in light contact with the ground, severing the stalks of small grain and bean crops at a point near ground level. The severed crop falls onto the surface of platform 18. Reel assembly 20 (See FIG. 2) mounted on support arms 22 and 24 rotates such that the reel bats (see bats 26 in FIG. 2) travel from front to back across platform 18 sweeping the cuttings into rotating cross auger 28. As viewed in FIG. 1, auger 28 rotates clockwise. Counter-wound spirals 30 and 32 at the ends of the auger are arranged to move the crop cuttings toward the center section of the auger. Fingers 34 protrude from the central drum region of the auger to urge crop material up the back side of the cavity in which auger 28 nests. Crops thus lifted pass into the throat of feeder conveyor 36. Feeder conveyor 36 has therein rotating chains 39, having cross slats 40 which lift the harvested crop material up the conveyor shaft and into the main cylinder of the crop processor (not shown).

Fingers 34 move cyclically in and out of the central drum region of the auger, being actuated by an internal cam mechanism. The fingers of each successive row are fully extended as they approach platform 18 and are then gradually withdrawn into the drum until they are fully retracted by the time they are opposite the end of rotating chains 38. The action of cyclically withdrawing and extending the set of fingers 34 serves to make them self cleaning in that stalks and weeds will not become entangled thereof to the point where they need removal by an operator.

Crop divider 42 separates the cup from the uncut crop. Crop divider 42 pivots on pin 44 such that the forward end of the divider moves freely up and down with terrain variations.

Figures 2, 3, 4:
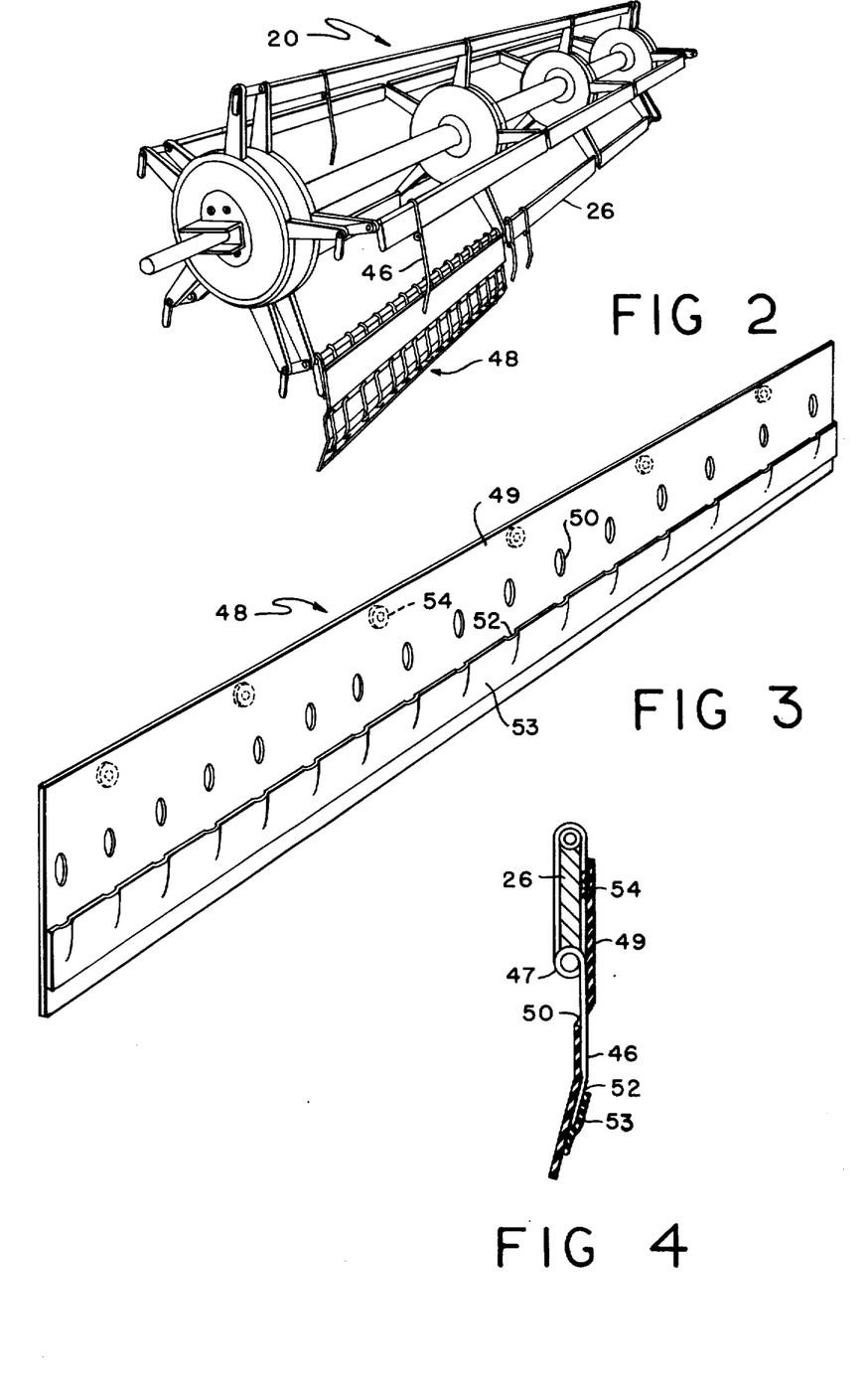
FIG. 2 shows an isometric view of a pickup reel which mounts on the support arms of FIG. 1 and having on one of its bat support sections a quick attach-detach flexible flap in accordance with this invention.
FIG. 3 is an enlarged view of our flexible flap showing details of its construction.
FIG. 4 is a cross-sectional view of the flap of FIG. 3 when mounted as shown in FIG. 2.

FIG. 3 shows a quick attach-detach flexible flap 48, provided in accordance with one embodiment of the invention. This flap mounts on bat sections 26 of reel assembly 20 shown in FIG. 2. One of the flexible flaps is shown installed on a bat section in FIG. 2 and it will be understood that like flexible flaps can be mounted on all bat sections of reel assembly 20. Use of the flexible flaps is helpful in reducing grain losses for conditions wherein the crop is dry and kernels shell easily on bumping or jarring. For these conditions use of the quick attach-detach flexible flaps assures more positive yet gentle plant control during the harvesting sequence. With the flaps, very few cut plants slide off platform 18 (see FIG. 1) and onto the ground as the reel bats sweep the cut plants off the cutter bar toward auger 28. Also, immediate removal of the cut plants from the vicinity of the cutter bar reduces the freeing of individual grain kernels due to vibratory shock.

As shown in FIGS. 2, 3 and 4, flexible flap 48 comprises a base sheet 49 made of a rubberized fabric or the like. Holes 50 in the base sheet are spaced for insertion therein of the plurality of reel fingers 46 mounted on each reel bat section 26. Snaps 54 allow easy attachment of flexible flap 48 to the reel bat 26. The flexible flap attaches as shown in FIG. 4. The lower section of the flap is on the back side of fingers 46 and the upper flap section is on the front side or fingers 46. Holes 50 in base sheet 49 are positioned so as to be below spring loop 47 in reel finger 46. The lower section of flap 49 has a strip 53 attached thereon as by cementing or vulcanizing (See FIG. 3) having pockets 52 into which the end of reel fingers 46 nest (See FIG. 4).

The FIG. 2 structure herein disclosed is generally of the prior art except for the modifications incorporated therein and illustrated in FIGS. 3 and 4 and further in that we use a reel of substantially larger working diameter than is conventional. We so proportion the reel that the sweeping motion of the flaps across the platform approximates a linear motion.

Strip 53 serves also as a stiffener for the lower edge of flap 48. This prevents flap buckling as the reel bats are forced into dense or matted growths.

With the flexible flaps attached as shown in FIGS. 2 and 4, the plant load holds the flaps against the backside of the reel fingers as the reel rotates. This transfers the plant load to the reel bats with the proviso that the plant are yieldably urged across the platform and into the auger. Front side attachment of the flaps to the reel bats eliminates wedging of plant stalks in between the flap and the bat. Use of the flexible flaps also eliminates wedging of plants between adjacent reel fingers. The flap also provides a firm leading edge for vertical insertion into the crop as the reel assembly rotates.

Figure 5:
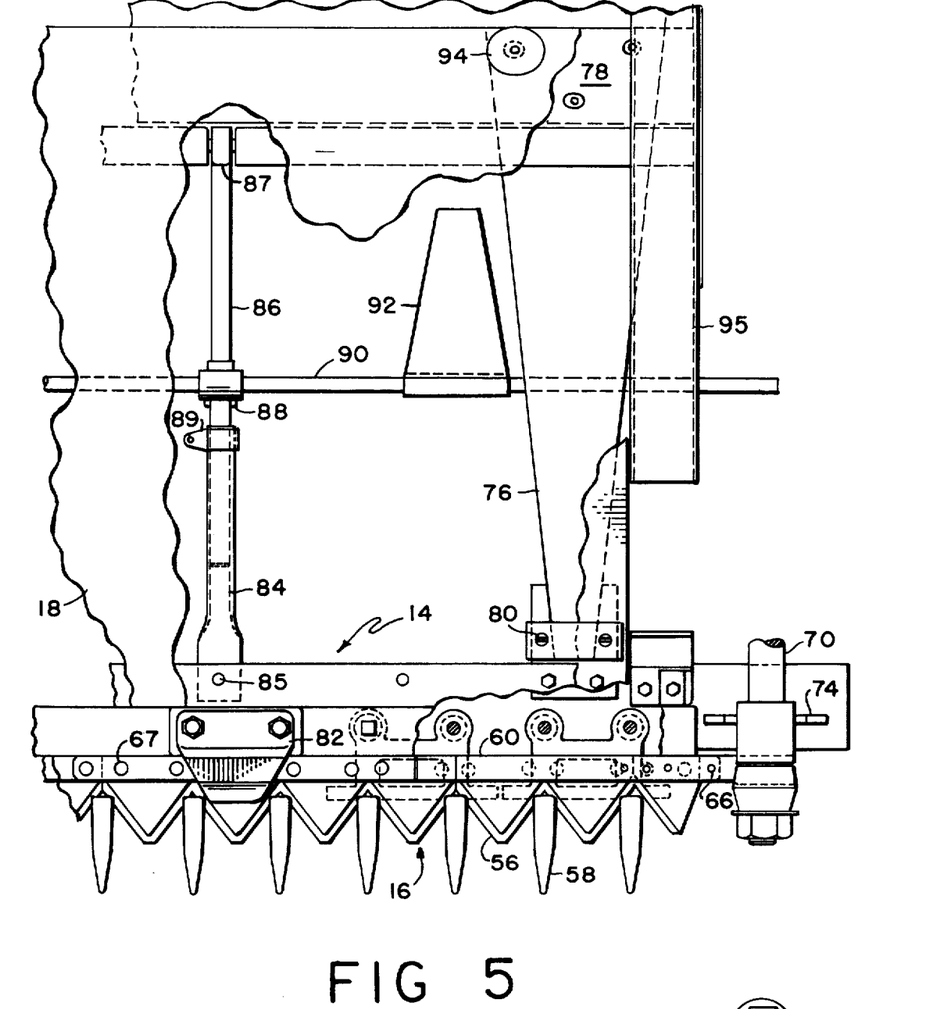
FIG. 5 is a cutaway view of the drive end of the cutter bar assembly showing the support structure between the cutter bar and the main frame of the harvester.

FIG. 5 shows a partially cutaway view taken at the drive end of the cutter bar. Cutter bar assembly 14 has on its leading edge a multiplicity of knife guards 58. Oscillating sickle 16 comprising a multiplicity of triangular knives 56 attached as by rivets to knife bar 60 moves back and forth so as to sever crop stalks coming between the knife edges and guards 58. As may be seen in FIG. 6, the oscillatory motion is achieved by the turning of crank arm 68 through an arc of approximately a half radian within the bearing formed at the top end of support 74. Turning of crank 68 through an arc of something like ±0.25 radian will result in pivot point 73 (See FIG. 6) moving not only left and right but up and down an amount equal to the length of crank arm 68 times the quantity (1 — cosine of the half arc in degrees). This up and down motion precludes direct attachment of crank arm 68 to the end of knife bar 60.

Figure 6:
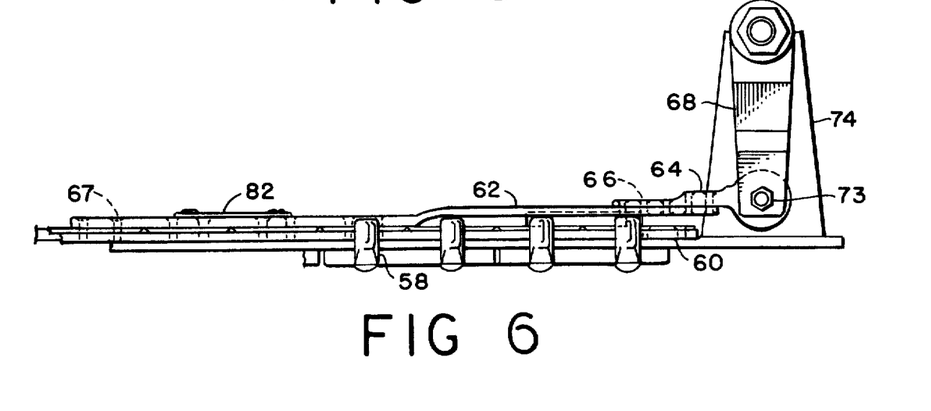
FIG. 6 is a front view of the cutter bar of FIG. 5 showing the sickle drive assembly.

To keep motion of knife bar 60 in a horizontal plane, pivot point 73 was attached by means of rivets 66 to a flexible piece of bar stock 62 via pivotal mount 64. Bar stock 62 is attached to knife bar 60 by means of countersunk rivets 67. Attachment is in an area that is sufficiently fare removed from the end of the knife bar so that flexing of bar stock 62 does not result in metal fatigue. In the unit reduced to practice the distance from pivot point 73 to the nearest of rivets 67 was about a foot. A series of knife hold down clip 82 keeps the sickle bar operating so that knives 56 maintain shear contact with guards 58.

Figure 7:
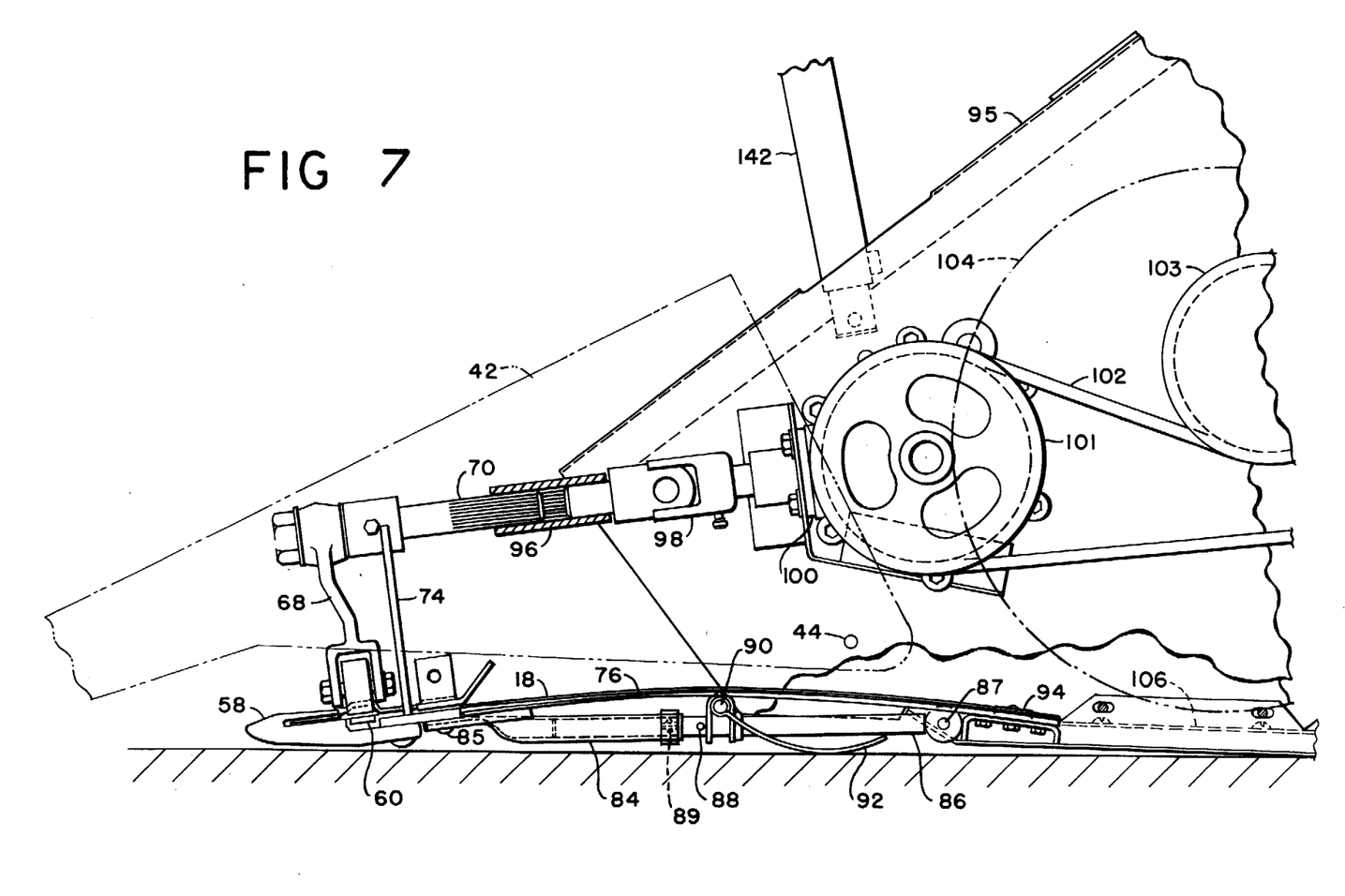
FIG. 7 is an end view of the cutter bar assembly as seen from the drive end showing the cooperation between the drive mechanism, the cutter bar, the constant strength leaf springs, the contoured deck, the stablizer supports and the ground sensing fingers.

The cutter bar assembly 14 mounts in cantilevered fashion to main frame 78 of harvester 12 by means of a number of equally spaced constant taper leaf springs 76 (See FIG. 5). Leaf springs 76 are firmly attached at their base ends to frame 78 as for example by bolts, and at their narrow ends attach to the cutter bar by means of a combination bolt and riveted assembly 80. FIG. 7 shows a side view of leaf springs 76 with harvester side panel 95 partially removed.

The FIG. 7 view shows how the skin of deck platform 18 lays immediately above and is supported by springs 76. This allows for a smooth contour that forms the arc of a circle which plants traverse all the way from where they are severed at sickle bar 16 to cavity 106 which is beneath rotating auger 28. The periphery of auger spiral is shown as phantom line 104 in FIG. 7.

The forward end of cutter bar 14 flexes up and down as the contour of the ground changes. This flexing is made possible by the use of springs 76. In order for flexing to be possible during the harvesting operation, the drive train has to move up and down at the cutter bar end. This is accomplished as shown in FIG. 7. Shaft 70 twists in alternate directions in the bearing at the end of support member 74. The driven end of shaft 70 has splines cut thereon for positive transfer of power from mating spline teeth on the interior of cylindrical member 96. Cylindrical member 96 is firmly attached to universal joint 98 which is fastened to the shaft extending from drive mechanism 100. In the unit reduced to practice mechanism 100 was of the swash plate type being driven from pulley 101 by means of rubber V-Belt 102. Drive mechanism 100 is secured to the frame of the harvester and as the cutter bar 14 flexes up and down, the drive train accommodates the changes by means of universal joint 98 and the spline section coupling cylinder 96 to shaft 70. The spline section allows the drive train to accommodate the fore and aft flexing of the cutter bar assembly.

To prevent buckling of the skin of platform 18 during the flexing, a series of large washers 94 are used with the bolts which hold the skin in place at the back edge of the platform. Washers 94 allow the holes in the skin to be of sufficient size to move slightly to and fro with respect to the axis of the tie down bolts.

In order to protect springs 76 from buckling when guards 58 bump into ostacles, there are a series of stabilizer bars interspersed along the length of the platform between leaf springs 76. Each stabilizer bar (See FIGS. 5 and 7) consists of: tubular member 84 which attaches to cutter bar 14 by bolt 85; cylindrical shaft 86 slideable within tube 84 and pivotally mounted to frame 79 at point 87; and, motion limit pin 88 which serves as a stop for the compressive deformation of the cutter bar toward the harvester frame.

The series of cylindrical shafts 86 serve as a support member for a multiplicity of sensing fingers 92. Sensing fingers 92 are attached to shaft 90 which is rotatably mounted by clamp-held-sleeves to cylindrical shafts 86. Spring urging means, not shown, tends to hold sensing fingers 92 in contact with the ground as shown in FIG. 7. The angular relationship between the sensing fingers and the platform deck of the harvester is used to automatically control the vertical positioning of the cutter carrying platform with respect to ground. Means for accomplishing automatic height control will be more fully explained later.

Figure 8:
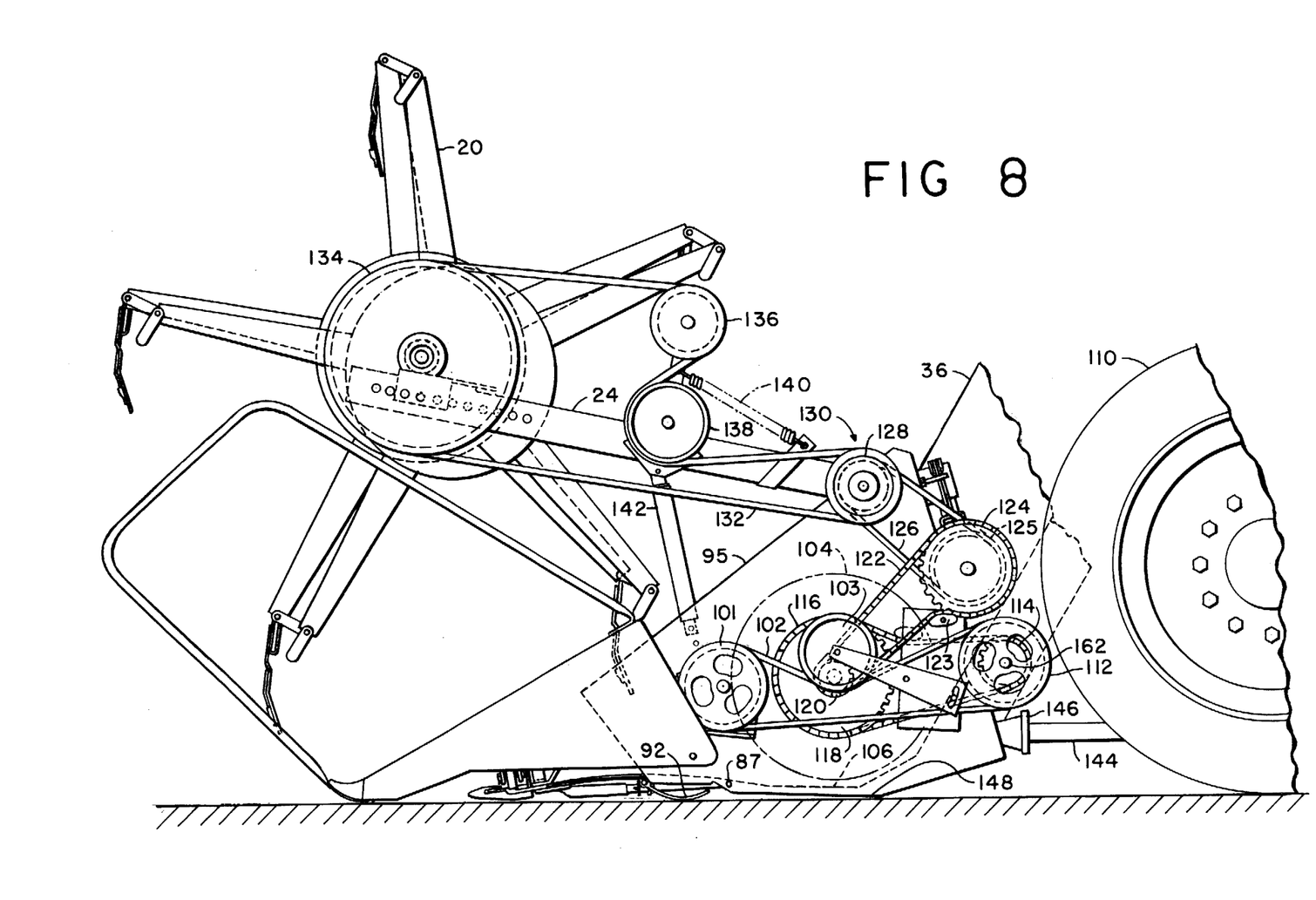
FIG. 8 shows a left hand end view of the harvester with protective covers removed so as to expose the power drive train.

Referring now to FIG. 8 there is shown an end view of the harvester with the protective covering of end plate 95 removed to show the drive train mechanism. Pulley 101 drives the sickle bar in the method explained above. Power to drive pulley 101 comes from drive pulley 112 via V-belt 102. Tension on belt 102 is maintained by idler pulley 103. Coaxially arranged on drive shaft 162 with pulley 112 is chain drive sprocket 114. Drive shaft 162 receives its power from the drive mechanism of the combine, mobile thresher or the like, which is represented only by driving wheel 110.

Figure 9:
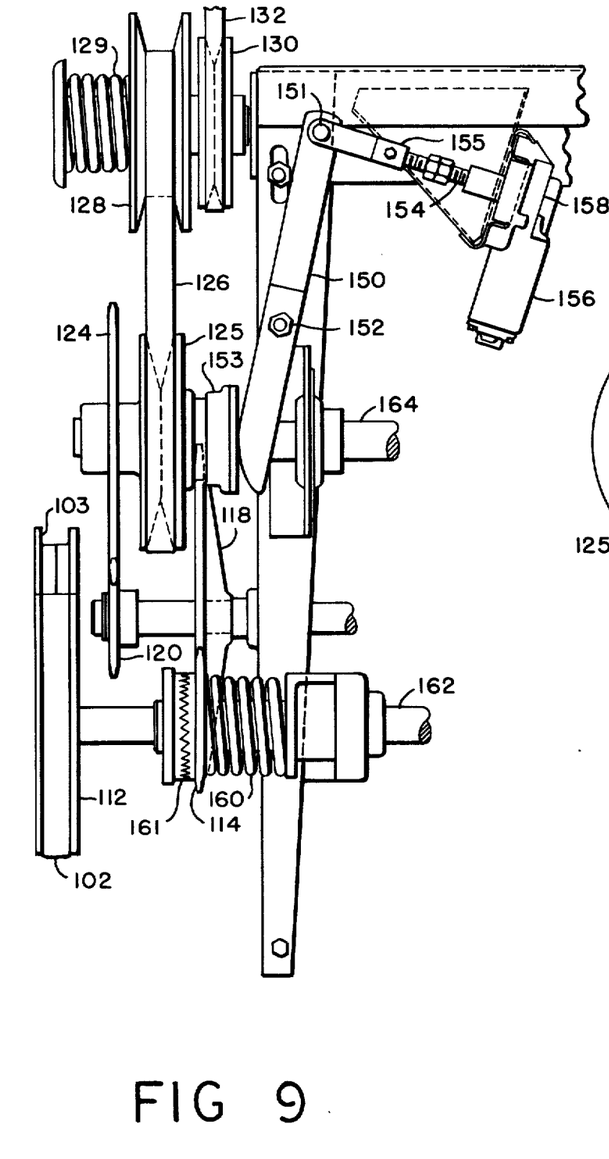
FIG. 9 shows the details of the reel speed adjustment mechanism.
Figure 10:
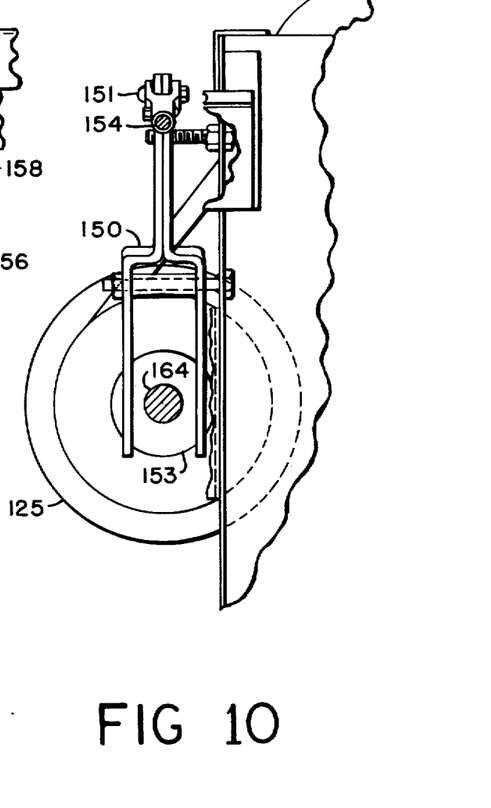
FIG. 10 is an end view of the servomotor shown in the top view of FIG. 9.

Chain drive sprocket 114 operates through driving chain 116 and sprocket 118 to furnish power to auger 28 which is depicted in outline form by phantom line 104. Coaxially mounted on the auger shaft with sprocket 118 is sprocket 120. Sprocket 120 drives sprocket 124 via chain 122. Tension on chain 122 is maintained by adjustable idler shoe 123. Sprocket 124 operates through a coaxially arranged pulley 125 to drive mating pulley 128 via V-belt 126. Pulleys 125 and 128 operate in combination to control the rotational rate of reel 20. This is better seen by reference to FIGS. 9 and 10. In FIG. 9 pulleys 125 and 128 are shown to be of the type wherein the sheave halves of the pulleys are separable. Belt 126 is depicted as riding low in pulley 128 and high in pulley 125. Under these conditions pulley 128 wound rotate at maximum speed.

Speed control is accomplished as follows. Lever arm 150 pivots on pin 152. The forked lower end of arm 50 (See FIG. 10) rides against thrust bearing 153 which is coaxially mounted with respect to pulley 125. Pressure can be exerted on thrust bearing 153 by means of shaft 154 which is clevis mounted to arm 150 by pin 151. Positional control of shaft 154 is achieved by electric drive means. Direct current motor 156 turns shaft 154 througn gear box 158. Clevis 155 has internally cut threads which mate with threads cut on the end of shaft 154. Thus, when motor 156 turns in one direction force is exerted on lever arm 150 to bring the sheaves of pulley 125 closer together. Conversely, rotation of the armature of motor 156 in the opposite direction allows the sheaves of pulley 125 to separate. Spring 129 mounted coaxially with pulley 128 applies force tending to bring the sheaves of pulley 128 together. This action keeps a constant tension on V-belt 126 since the action of spring 129 is such as to keep a continual side pressure on V-belt 126.

The machine operator has controls which allow him to operator motor 156 in either direction. Thus while underway, the operator can speed up or slow down the rotational rate of pulley 130 which is coaxially mounted and locked to the same shaft as pulley 128. Belt 132 rides on pulley 130.

Turning now to FIG. 8, it can be seen that belt 132 furnishes the drive power for operating reel 20 via the large diameter pulley 134 mounted coaxially to the reel. Idler pulleys 136 and 138 maintain proper tension on belt 132 via the take-up mechanism associated with spring 140.

Reel 20 may be raised and lowered to accommodate the height of the crop being harvested. This is done by actuation of piston 142 which operates to raise and lower arm 24. There are two of the pistons 142, one at each end of the harvester (See FIG. 1) and the two pistons operate in unison.

During machine operation, the operator will adjust the forward speed of the vehicle to accommodate crop and terrain conditions. With forward speed optimized, he then advances or reverses motor 156 (See FIG. 9) so as to match the speed of reel 20 (See FIG. 8) to the forward speed of the harvester. The operator will adjust reel speed so as to have the reel flaps 48, or the reel fingers 46 for cases where reel flaps are not used, cross the surface of the cutting bar at a rate that is slightly in excess of the forward speed of the harvester through the field. This will assure that crop cuttings are cleared from the cutting bar area as fast as the plants are severed from their roots.

FIG. 9 shows one additional feature of the harvester. Main drive power comes in via shaft 162. Spring 160 and toothed clutch 161 combine to form a safety release mechanism should the auger and reel loads become excessive.

Elevation control of the cutting bar is explained by reference to FIG. 11. The main frame 78 of the harvester has feeder conveyor 36 extending upwardly from its midsection. Feeder conveyor 36 mounts pivotally onto the front end of combine 170 by means of locking mechanism 168. Locomotion for combine 170 is provided by drive wheel 110 and its near side companion, not shown. From mounting axle 172 of drive wheel 110 there is suspended hydraulic cylinder 174. The piston actuated extendable shaft 144 of cylinder 174 is insertably positionable in bell housing 146. It is to be noted that the FIG. 11 embodiment is depicted for functional simplicity and that in reality there are two hydraulic cylinders 174 and two bell housings 146, one on either side of feeder conveyor 36. Application of fluid pressure through supply line 178 serves to raise the cutter carrying platform off the ground. A decrease in pressure at supply line 178 results in lowering the platform toward the ground.

Figure 11:
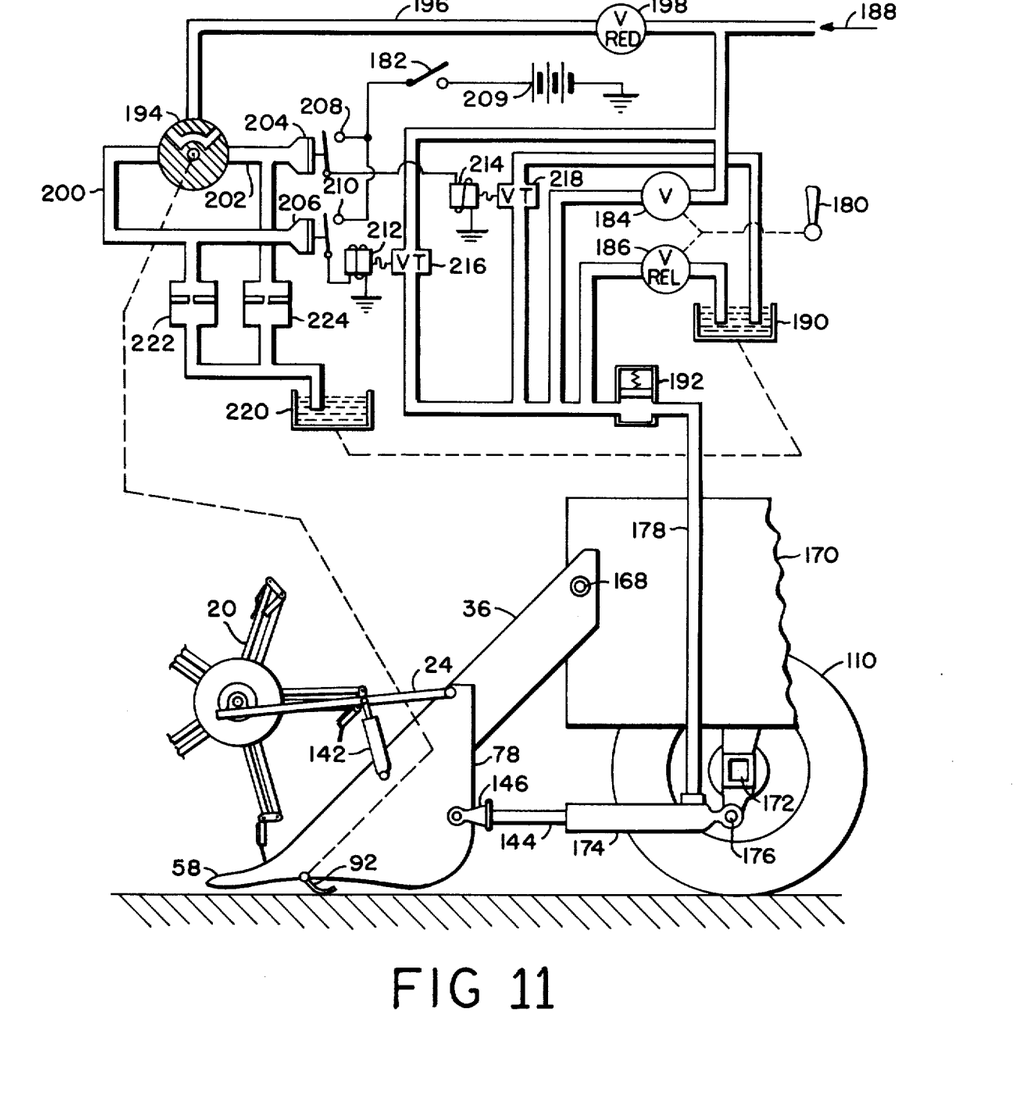
FIG. 11 shows a harvester unit in partial end view as associated with the frame structure of a typical combine and showing in schematic form the hydraulic and electrical servo system employed for cutter bar elevational control.

The schematic of FIG. 11 shows the hydraulic and electrical servo system which is employed for elevational control of the cutter bar. With the system shown, both manual and automatic height control modes are provided. Manual control is achieved through operator manipulation of control lever 180. Automatic control is enabled by closure of switch 182.

In the manual control mode the operator raises the cutting height by manipulation of lever 180 so as to open valve 184. Opening of valve 184 allows high pressure oil to flow in from source 188 which may, for example, be the hydraulic pump on the combine. This increases the pressure in line 178 and extends the piston in cylinder 174 so as to force platform 78 further from axle 172.

Turning lever 180 in the opposite direction opens pressure release valve 186 resulting in a withdrawl of the piston in hydraulic cylinder 174. This causes the guards 58 to drop closer to ground level. Oil pressure thus released passes through valve 186 and into oil sump 190.

Pressure accumulator 192 functions to smooth out the response due to traversing uneven terrain as well as the normal bumps and jolts experienced by opertional farm machinery.

In the automatic mode, electrical switch 182 is closed and the hydraulic system responds to signals emanating from sensing fingers 92. Sensing fingers 92 are biased by spring urging means so as to attempt to turn fingers 92 in a clockwise direction (as shown in the view depicted in FIG. 11) in an effort to sense the presence of ground level. Rotation of sensing fingers 92 is linked to two-way valve 194. Two-way valve 194 receives a supply of hydraulic fluid from supply line 196. The fluid in line 196 is at a reduced pressure from that of the main supply 188 due to the presence of reducing valve 198. Use of reduced pressure in the automatic control section cuts down on leakage and makes actuation of valve 194 easy. As depicted in FIG. 11, two-way valve 194 has a built-in dead zone. This keeps the sensing mechanism from continually hunting in that there is an appreciable mid-range set of values for platform height above ground wherein sensing fingers 92 are satisfied with the status quo.

However, when the cutter platform gets too close to ground level, sensing fingers 92 will be turned back to approximately the 3-o'clock position and valve 194 will turn so that fluid from line 196 passes through to line 200. Pressurization of line 200 closes contacts 210 in bellows switch 206. Closure of contacts 210 energizes by means of battery 209 the coil of solenoid valve 212 which opens throttle valve 216 further displacing the piston 144 of hydraulic cylinder 174. This results in the raising of the harvester platform until the sensing fingers 92 rotate so as to close the connection in valve 194 between lines 196 and 200.

With the supply cut off from line 200, orifice 222 bleeds off residual pressure, thus assuring that valve 206 relaxes so as to open switch contacts 210.

Conversely, when the cutter carrying platform is too high above ground level, sensing fingers 92 rotate clockwise to something like a 5o'clock position where two-way 194 allows fluid to pass from supply line 196 to line 202. Pressure in line 202 actuates bellows switch 204, closing switch contacts 208. Powered by battery 209, this energizes soleniod valve 214 and opens throttle valve 218. Actuation of throttle valve 218 dumps fluid in line 178 until such point as the cutter carrying platform gets close enough to ground level to cause sensing fingers 92 to close valve 194. With no more fluid being delivered to line 202, residual pressure in the line is bled off into sump 220 via orifice valve 224.

As described above then, in the automatic mode, the sensing fingers exercise the hydraulic pressure at cylinder 174 to keep the level of the cutter carrying platform within a prescribed range of acceptable operational values.

when going from one job to the next or when harvesting a crop such as wheat or rye, the operator can disable the automatic height control system by opening switch 182. The operator can then manually adjust the height of the cutting bar by means of control level 180.

When cutting grain whose stalks can be severed several inches above ground level, such as wheat, the operator may want to disable the flexible cutting bar feature. This is possible. The grain platform is raised to a reasonable height above ground position. Then (see FIG. 45) the stabilizer bars are clamped and both crop dividers pinned fixedly to the cutter carrying platform. The stabilizer bars are clamped by tightening the screws which connect one flange of clamp 89 to its mating section. Compressing clamp 89 rigidly locks tubular member 84 to cylindrical shaft 86. With all stabilizer bars thus locked in place, the harvester performs in much the same way as the more conventional combine header unit. Loosening of clamps 89 converts the harvester to full flexing cutter status. The crop divider must also be unpinned and returned to the full flexing status.

Figures 12, 13:
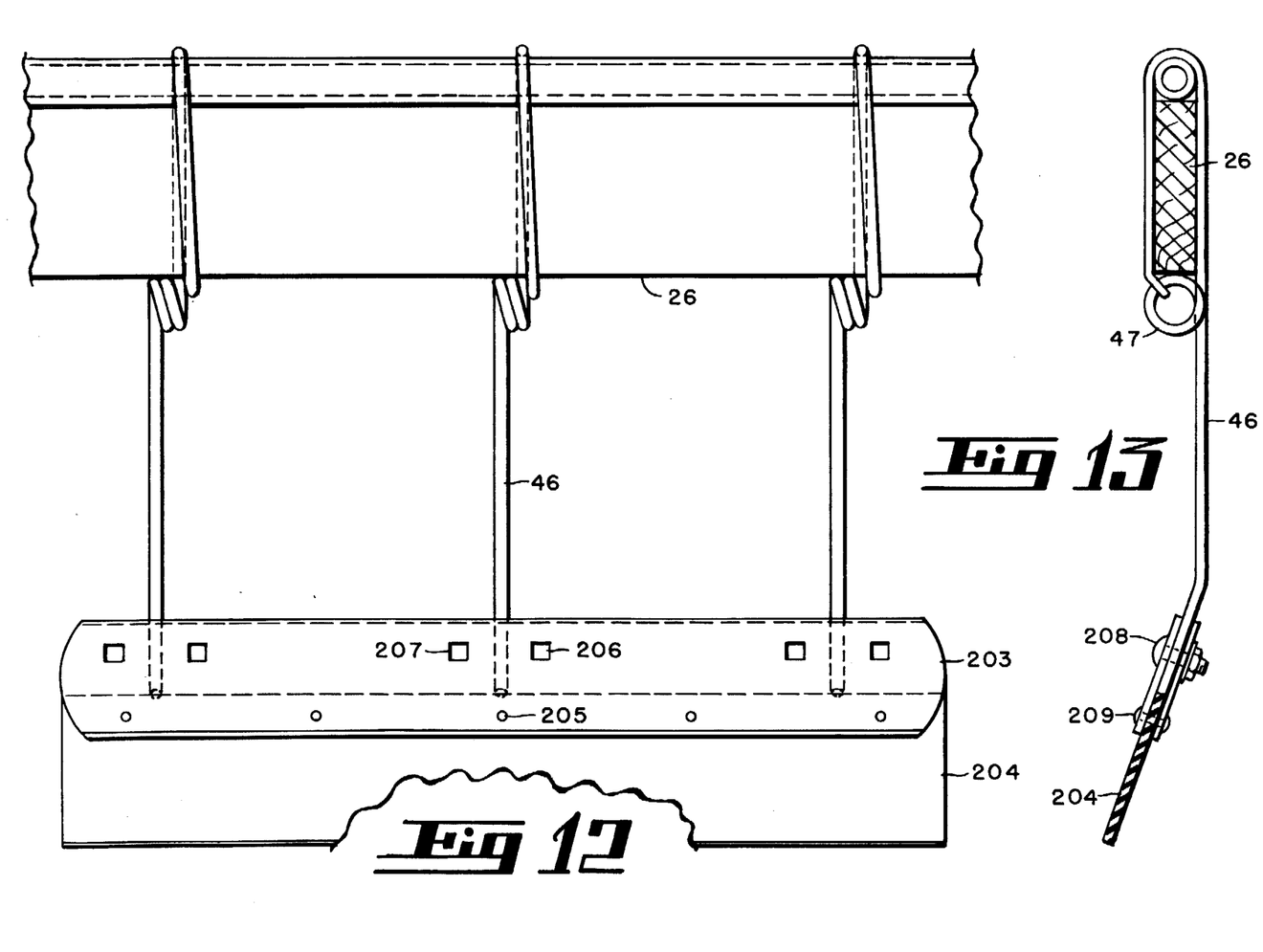
FIG. 12 shows an alternate embodiment of the flexible flap which is configured to span three rake fingers.
FIG. 13 is a cross-sectional view of the flap shown in FIG. 12.

FIGS. 12 and 13 show an alternate and preferred embodiment of the flexible flap. This means of implementation consists of a flexible sheet 204 sandwiched between two metal plates 203. Plates 203 are clamped at the ends of reel fingers 46. In the unit reduced to practice each flap section was sized such that it spanned 3 reel fingers, as shown in FIG. 12. Base sheet 204 can be made of rubberized fabric or the like in a similar manner to base sheet 49, shown in FIG. 3.

Flexible sheet 204 is shown in FIGS. 12 and 13 as being attached by rivets 209 to plates 203 via holes 205 cut therethrough. It will be understood that other means of attaching (for example, vulcanizing) would work equally well.

Plates 202 clamp to the reel finger ends by means of carriage bolts 208 which are inserted through holes 206 and 207 cut through plates 203 on either side of each reel finger 46.

Figure 14:
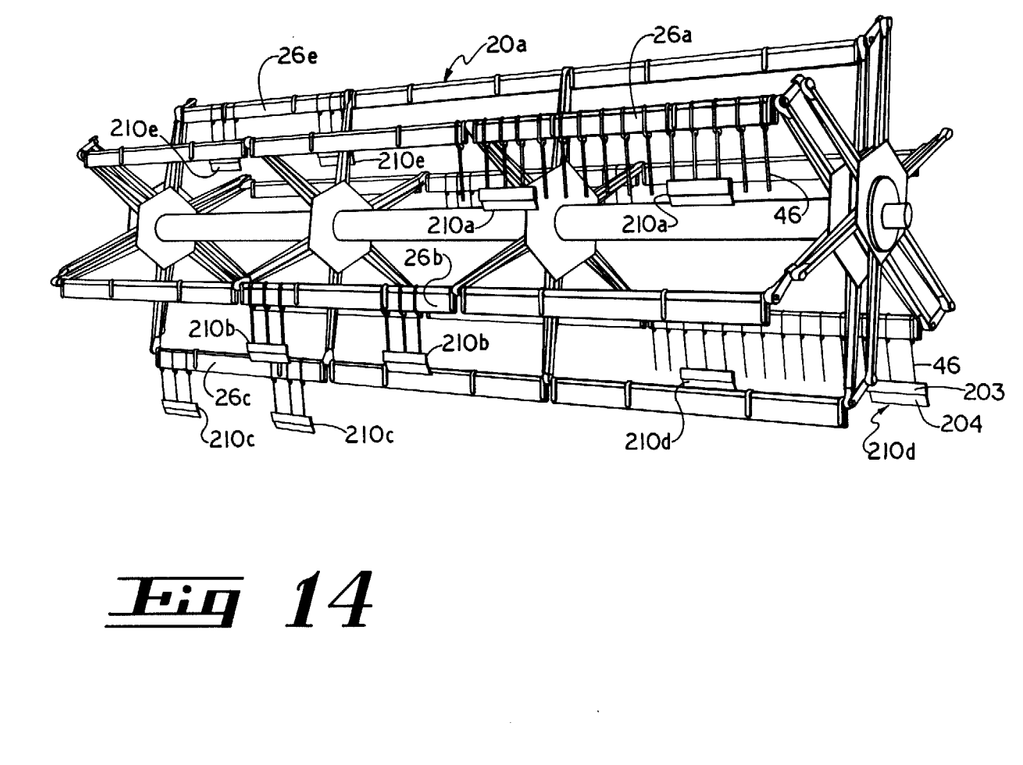
FIG. 14 shows an isometric view of a pickup reel which mounts on the support arms of FIG. 1 and having on its bat support sections a multiplicity of the interval spaced flexible flaps of the type shown in FIG. 12.

In practice then, the FIG. 12 flap section embodiments are attached at staggered intervals on the bat sections shown in the reel assembly 20a of FIG. 14. The FIG. 14 reel assembly differs from the FIG. 2 reel assembly primarily in that is contains six rather than five reel bat assemblies around its circumference. For the reel assembly 20a of FIG. 14, each bat section carries a dozen or more reel fingers or tines. Specifically bat section 26a is shown with 14 reel tines 46. Two flap sections 210a are clamped to reel tines 46 at a spaced interval along bat section 26a. Moving around the same right hand section of reel assembly 20a by 180°, there are two similar flap sections 210d mounted on reel tines 46. Flap section 210d are each transversely displaced the width of two reel tines from the rotational position of flaps 210a.

Moving on to the center section of reel assembly 20a, there are flap sections 210b which are clamped in place on the reel tines of bat section 26b. Bat section 26b is counterclockwise rotationally advanced one stage from bat section 26a. In the same manner as previously discussed there will be a companion pair of flap sections (not shown) which are located 180° around the reel assembly from flaps 210b. These flaps will also be laterally displaced by two reel tine positions from flaps 210b.

The third section of reel assembly 20a likewise has two pair of the flap sections mounted thereon, each pair being rotationally displaced from the flaps on the other two reel sections. Flaps 210c are mounted on the reel tines of bat section 26c and flap sections 210e are mounted on the reel tines of bat section 26e. Again, it is noted that the flaps sections 210e are laterally displaced by two reel tines from the rotational position of flap sections 210c.

Further, it is to be noted that each flap section (see flap 210d on the right side of FIG. 14) is made up of flexible sheet 204 sandwiched between plates 203 as described earlier with reference to FIGS. 12 and 13. Additionally, it should be understood that each of the bat sections 26a, b, c, d and e are fully populated with reel tines 46. The FIG. 14 drawing shows only those reel tines needed for descriptive clarity.

With two of the FIG. 12 flap embodiments clamped to the reel tines of each bat section and the intervals staggered as one progresses from bat section to bat section several things are achieved. First, the reel assembly remains dynamically balanced. Second, with pistons 142 (see FIG. 8) set so that the flexible flap sections lightly touch the contoured deck over which the reel assembly rotates, loose kernels of grain are brushed across the contoured deck and into the cavity beneath the auger at least once per revolution of the reel assembly. Third, since more than half of the reel tines have no flaps attached thereto, the ability of the harvester to pick up down grain is retained. Fourth, the flap sections can be positioned so as to concentrate their sweeping action in the area where row crops such as soybeans are most likely to fall on the deck section after being cut.

As may be seen by reference to FIGS. 12, 13 and 14, each bat section 26 is fastened by securing clamp 220 to a companion shaft section 222. Shaft sections 222 extend beyond the end of bats 26 and are rotatably journaled in reel arms 224 which extend radially outward from the reel hubs 226. An eccentrically mounted control hub 228 is provided at each end of the reel assembly for synchronous rotation with the reel hubs. The arms of the control hub connect by linkage arms 230 to the ends of shafts 222. Linkage arms 230 and the eccentrically mounted control hub 228 cause shaft 222 and the adjacently mounted bats 26 to rotate along their longitudinal axes during rotation of pickup reel 20a. Rotation is so controlled that reel tines 46 which encircle the bats 26 (see FIG. 13) maintain a selected positional inclination for all angular positions of the reel assembly (see FIG. 14). With reel tines 46 thus positionally inclined, bat sections 210 also remain at a correct angle of inclination as they brush a front to back path across platform 18 (see FIG. 1).

Subject matter disclosed but not claimed herein is claimed in the aforesaid copending U.S. pat. application of Millard M. Williams and Robert A. Stelzer.

It will be understood that the invention is not limited by the specific embodiments disclosed in the drawings. Various modifications can be made with regard to the particular reel and flap structures without limiting the scope of this invention which is set forth in the following claims.

We claim:

1. In combination with a grain and bean harvesting machine of the type intended for transverse mounting in front of a mobile thresher and including a main supporting frame, a contoured horizontal platform supported from the lower part of said frame, a cutter bar assembly flexibly mounted to the leading edge of said horizontal platform, a rotating cross auger supported on said frame at the rear of said platform, a feeder conveyor supported on said frame aft of said auger, said conveyor providing for the transfer of crop cuttings from said auger to said mobile thresher, and a reel assembly rotatably mounted on adjustable arms supporting said reel from said frame above said horizontal platform adjacent the front thereof, with said reel assembly having a plurality of bat sections along its periphery, each of said bat sections carrying a multiplicity of reel tines for picking up down grain, the improvement which comprises:

a plurality of flexible flaps, each comprising a sheet of flexible material, and means connecting said flaps to selected ones of a small fraction of said tines, said flaps being longitudinally spaced and angularly staggered on said bats, the spacing and staggering of said flaps providing for the sweeping of substantially the entire width of said platform, the outward extending edges of said flexible flap sections, which are connected to the tines occurpying the lowest horizontal position, contacting the contoured horizontal platform over which said reel assembly rotates whereby loose kernels of grain are brushed into said rotating cross auger at least once per each revolution of said reel assembly.

2. The invention as defined in claim 1 wherein each of said flaps comprises a sheet of flexible material connected in sandwich fashion along one edge between a pair of metal plates and having means for the clamping of said plates to the outward points ends of at least two adjacent said reel tines.

3. The invention as defined in claim 2 wherein said flaps are connected to approximately 1/n (for n equal to or greater than 3) of the total population of said tines with n being the number of bats passing over said platform per each revolution of said reel assembly.

4. The invention as defined in claim 2 wherein each of said flexible flaps spans three reel tines.

5. The invention as defined in claim 1 wherein the flexible flaps are made of a vulcanizable rubber material.

6. The invention as defined in claim 1 including means for pivotally mounting said plurality of bats from which said reel tines project to provide for rotational movement of said bats about their longitudinal axes, and including in said reel assembly means for synchronizing rotational movement of said bats with the rotation of said reel assembly whereby a selected positional inclination of the reel tines is maintained during rotation of the reel assembly above said horizontal platform.

* * * * *